United States Patent Office 2,994,721
Patented Aug. 1, 1961

2,994,721
RECOVERY OF ETHER AND ALCOHOL FROM ACID-PROPYLENE EXTRACTS
Samuel Winfield Wilson and Worthy Truman Boyd, Baton Rouge, La., assignors to Esso Research and Engineering Company, a corporation of Delaware
No Drawing. Filed Apr. 27, 1956, Ser. No. 580,975
3 Claims. (Cl. 260—614)

This invention is concerned with a process for the recovery of ethers and alcohols from olefin hydration reaction products. More particularly, it is concerned with a two stage method of generating isopropanol and and diisopropyl ether from sulfuric acid-propylene extracts.

In brief compass, this invention comprises a two stage process for recovering alcohol and ether from the acid extract reaction product formed by absorbing propylene in strong sulfuric acid. This two stage process comprises heating sulfuric acid-propylene extract in an ether generation zone at a temperature in the range of 80° to 120° C. to evolve vaporous diisopropyl ether therefrom, the extract originally having an acid strength in the range of 63 to 72 wt. percent on a hydrocarbon free basis and having an extract saturation equivalent to 0.8 to 2.0 moles of absorbed propylene per mole of 100% acid, recovering vaporous product overhead, withdrawing parially desorbed extract from the ether generation zone containing at least 0.4–1.4 moles of propylene per mole of 100% acid, diluting said partialy desorbed extract to an acid strength in the range of 45 to 54 wt. percent on a hydrocarbon free basis, charging the extract so diluted to an alcohol generation zone, heating by steam stripping the diluted extract therein to a temperature in the range of 80° to 130° C. to evolve vaporous isopropanol therefrom, recovering vaporous product overhead, recovering a weak 45 to 54 wt. percent acid containing under 0.01 mole of propylene per mole of 100% acid from said alcohol generation zone, and separating and recovering isopropanol and diisopropyl ether from said vaporous products.

It has been conventional in the art to hydrate olefins such as ethylene, propylene and butenes by absorbing them in a strong liquid acid catalyst and then generating or distilling alcohols and ethers therefrom. More particularly, it is known to hydrate propylene by first absorbing it in sulfuric acid of about 65 wt. percent acid strength to obtain an acid extract containing about 1.4 moles of propylene per mole of 100% $H_2SO_4$. The acid extract so obtained may be heat soaked to increase ether yield, the heat-soaked material being distilled or stripped to recover vaporous ether and alcohol. In some processes, the acid extract may be reduced in acid strength as by dilution with water before the ethers and alcohols are recovered. The weak acid remaining from the generation step may be reconcentrated if necessary and recycled to the absorption zone.

Conventional hydration processes suffer some disadvantages when trying to recover high yields of ether with low yields of alcohol. Ether yields are not as good as they might be and in the case of the hydration of propylene, a large amount of propylene may be regenerated during the distillation or stripping step which, if recycled, results in a considerable investment in compressor equipment. There is also some loss in yield to undesirable side reaction products such as polymers and acetone.

The present invention proposes a two stage process for the recovery of the hydration products of acid olefin extracts under select conditions whereby a surprisingly high yield of ether can be obtained when desired. By operating with two stages in accordance with the teachings of this invention, great flexibility is given to the process, whereby the ratio of ether and alcohols produced may be widely varied in response to market demands.

While applicable in general to any olefin hydration process, particularly good results are obtained when using this invention to produce isopropanol and diisopropyl ether and the invention will be described in relation to this particular process. The diisopropyl ether so obtained has particular value in motor fuel blends because of its high octane blending value but also finds use as a solvent and as a chemical raw material. The isopropanol produced is widely used as a solvent and as a chemical raw material.

It is preferred to use as a starting material for the present invention, a sulfuric acid extract having an acid strength in the range of 63 to 72 wt. percent on a hydrocarbon-free basis and containing 0.8 to 2.0 moles of adsorbed propylene per mole of 100% acid. The preparation of this acid extract forms no part of this invention but one method will be briefly described for purposes of clarity. A suitable acid extract may be prepared by counter-currently absorbing a gas containing more than 30 vol. percent propylene in a sulfuric acid solution of about 63 to 72 wt. percent acid strength on a hydrocarbon-free basis at a pressure ranging from atmospheric to several hundred pounds per inch and at a temperature in the range of 50° to 110° C. This contacting may be carried out in a conventional packed tower, bubble cap tower or similar multistage unit known in the art. The acid used to absorb the propylene may be recycled acid obtained from the ether-alcohol generation steps and acid concentration steps. The acid extract so obtained by absorbing propylene may if desired, be first heat soaked at a temperature in the range of 80° to 120° C. for a time in the range of 10 minutes to 300 minutes and at a pressure in the range of 0 p.s.i.g. to 300 p.s.i.g. to permit equilibrium conditions to be reached.

According to this invention, diisopropyl ether and isopropanol are recovered from the above acid extract in two stages under select conditions such that increased yields of ether are obtained with minimum losses to secondary reaction products. The first zone, which may be termed the ether generation zone, is used to recover product containing predominant proportions of ether from the acid extract. The acid extract is maintained in this zone at a relatively high acid strength. In the second zone, the alcohol generation zone, the partially desorbed extract from the first zone is maintained at a lower acid strength and is further treated to generate a vaporous product containing predominantly alcohol. The weak acid remaining from the second zone may be reconcentrated, recycled, and refortified with propylene. The vapors from each zone are recovered and mixed together or are treated separately to separate diisopropyl ether and isopropanol products therefrom.

Specially selected conditions of temperature, pressure, acid strength and propylene saturation are maintained in each zone, whereby high yields are obtained with controlled product selectivity.

The ether generation zones comprise conventional equipment such as single stage flash zones with integral heaters, conventional regenerators (packed or with bubble cap, etc.) and kettles with integral heaters. A stripping gas such as nitrogen, but preferably propylene, may be used to aid in the recovery of the ether and steam stripping to recover the alcohol from the single stage or from the second stage of a two stage process. The zones may be heated by conventional means such as by heating surfaces in contact with the acid extract, heating pump-around streams, heating inlet streams and stripping gas, if used, and similar methods.

The following examples are further illustrative.

EXAMPLE 1

In the first ether generation zone, it is preferred to maintain the pressure in the range of 0 to 15 p.s.i.g., the temperature in the range of 85° to 115° C., the average acid extract residence time in the range of 10 to 300 minutes, and the acid strength in the range of 60 to 72 wt. percent on a hydrocarbon-free basis. If necessary, water, recycled or extraneous alcohol or ether may be admixed with the fresh acid extract to arrive at the proper acid strength before it is admitted to the first zone, or while it is in the first zone. Also, water is admitted to the acid extract before it is passed to the second zone in order to adjust the acid strength to a lower value of 45–54% on an alcohol and ether free basis. The acid extract in the first zone is preferably not completely desorbed of propylene although the amount removed is controlled to control the ratio of ether and alcohol produced and the total yield. Preferably, the acid extract removed from the first zone contains from 0.6 to 1.2 moles of absorbed propylene per mole of 100% acid.

By operating under these conditions 0.1 to 0.3 mole of diisopropyl ether, .05 to 0.1 mole of isopropanol and 0.05 to 0.1 mole of regenerated propylene per mole of absorbed propylene, originally in the acid extract are evolved and recovered overhead from the first zone. If the yield of ether is increased beyond this range, conversion to propylene increases and selectivity to hydration products rapidly falls off.

In the second alcohol regeneration zone, the preferred conditions are: pressure 9 to 8 p.s.i.g., temperature 90° to 110° C., average acid extract residence time 1 to 5 minutes, and acid strength 45 to 54 wt. percent on an alcohol and ether-free basis. The acid extract is treated, steam stripped or heated, to an extent sufficient to reduce the amount of absorbed propylene to below 0.01 mole of propylene per mole of 100% acid.

Under described conditions, the vapors withdrawn overhead from the second zone will contain .01 to .02 mole of propylene, .85 to .93 mole of isopropanol and .02 to 0.07 mole of diisopropyl ether per mole of absorbed propylene in the acid extract introduced from the first zone.

The weak acid extract withdrawn from the second zone may be reconcentrated to an acid strength of about 63 to 72 wt. percent as by a Simonson-Mantium concentrator and returned to the absorption zone to repeat the cycle. The propylene regenerated from the acid extract during the generation of the ether and alcohol may be separated from the vaporous conversion products, compressed, if desired, and returned to the absorption zone. As indicated above, however, it is preferred to use this recovered propylene as a stripping gas in the generation zone because it aids in the generation of the vaporous product and favorably influences the equilibrium reaction by suppressing propylene regeneration.

The various conversion product may be combined or may be separately treated by conventional means to recover the ether and the alcohol. Any suitable method may be used. For example, the vapors may first be contacted in the vapor or liquid state with aqueous caustic and then fractionated to recover the ether product leaving an aqueous alcohol solution. This aqueous alcohol solution may then be stripped or distilled to recover an alcohol-water azeotrope produce.

Besides controlling the conditions in the reaction zone and the amount of conversion therein, the product selectively may also be influenced by recycling some of the product either the ether or the alcohol to either of the reaction zones or to a soaking zone prior to the reaction zones.

This two stage ether alcohol generation process results in propylene conversions (moles of propylene as ether plus alcohol per mole of originally absorbed propylene) in the range of 85 to 95%. The ether/alcohol ratio may readily be varied in the range of 1/9 to 3/7 wt. percent by selection of the appropriate conditions as will be apparent to those skilled in the art. Even higher yields of ether may be obtained by operation of the first stage only and recycle of extract back to the absorption stage for refortification with propylene.

EXAMPLE 2

The following table presents data illustrating this invention. The results shown for the single stage runs are typical of those obtained when feeding the extract to a packed or bubble cap tower using water dilution to give an acid strength of 45%–54% on an alcohol and ether free basis and stripping with steam. The results shown for the two stage runs are typical of results obtained when feeding the extract to the ether generation zone diluted with water approximately equivalent to the amount of water in the products removed (1st stage) followed by water dilution and steam stripping in a packed or bubble cap tower (2nd stage).

Table I

| Type of Operation | Temp., ° C. | Residence Time, Minutes | Inlet Saturation | Yield of Propylene in Products as Mol. Percent of Propylene in Feed Extract | | | | |
|---|---|---|---|---|---|---|---|---|
| | | | | Propylene | Ether | Alcohol | Acetone | $C_6+$ |
| Single Stage [a] | 95–110 | 2–5 | 1.37 | 3.7 | 8.7 | 87.3 | 0.2 | 0.1 |
| Two Stage: | | | | | | | | |
| 1st Stage | 107 | 300 | 1.37 | 4.2 | 20.7 | 1.8 | 0.3 | 0.6 |
| 2nd Stage [a] | 95–110 | 2–5 | 0.83 | 1.3 | 3.0 | 68.1 | 0.0 | 0.0 |
| Total | | | | 5.5 | 23.7 | 69.9 | 0.3 | 0.6 |
| Single Stage [a] | 95–110 | 2–5 | 1.42 | 3.8 | 8.7 | 87.2 | 0.2 | 0.1 |
| Two Stage: | | | | | | | | |
| 1st Stage | 110 | 16.0 | 1.42 | 3.7 | 19.5 | 6.4 | | 0.4 |
| 2nd Stage [a] | 95–110 | 2–5 | 0.98 | 1.3 | 3.2 | 66.5 | | 0.0 |
| Total | | | | 5.0 | 22.7 | 72.9 | | 0.4 |

[a] Diluted with water prior to steam stripping to give 45–54 wt. percent $H_2SO_4$ on an alcohol and ether free basis.

The data in the foregoing Table I show the flexibility of operations in varying the ether and alcohol yields. It can be seen that maximizing alcohol production is accomplished by diluting the extract with water to give 45–54 wt. percent $H_2SO_4$ on an ether-alcohol-hydrocarbon free basis while stripping with steam in conventional stripping equipment. This type of operation is shown as the single stage operation. However, if it is desirable to maximize ether, the extract is fed to the ether generation zone, designated as 1st stage in the two stage operation, and then to the second stage which is operated in the same manner as the generator in the single stage operation.

Having described this invention, what is sought to be protected by Letters Patent, is succinctly set forth in the following claims:

1. A process for producing isopropanol and diisopropyl ether which comprises heating a sulfuric acid-propylene extract in an ether generation zone at a temperature in the range of 80° to 120° C. to evolve vaporous diisopropyl ether therefrom, said extract originally having an acid strength in the range of 63 to 72 wt. percent on a hydrocarbon-free basis and containing 0.8 to 2.0 mole of absorbed propylene per mole of 100% acid, recovering vaporous product overhead, withdrawing partially desorbed extract from said ether generation zone containing at least 0.6 mole of propylene per mole of 100% acid, diluting said partially desorbed extract to an acid strength in the range of 45 to 54 wt. percent on an alcohol and ether free basis, charging the extract so diluted to an alcohol generation zone, heating the diluted extract therein to a temperature in the range of 80° to 130° C. to evolve vaporous isopropanol therefrom, recovering vaporous product overhead, recovering a weak acid extract containing under 0.01 mole of propylene per mole of 100% acid from said alcohol generation zone, and separating and recovering isopropanol and diisopropyl ether from said vaporous products.

2. The process of claim 1 wherein said ether generation zone is operated at a pressure in the range of 0 to 15 p.s.i.g., and said alcohol generation zone is operated at a pressure in the range of 0 to 5 p.s.i.g.

3. A process for producing isopropanol and diisopropyl ether, which comprises introducing from an olefin absorption zone into an ether generation zone a sulfuric acid-propylene extract having an acid strength in the range of 63 to 72 wt. percent on a hydrocarbon-free basis and containing 0.8 to 2.0 mols of propylene per mol of 100% acid, heating the said extract in the ether generation zone at a temperature in the range of 85° to 115° C. for a time in the range of 10 to 300 minutes to generate 0.1 to 0.3 mol of vaporous diisopropyl ether per mol of originally absorbed propylene, withdrawing partially desorbed extract from said ether generation zone containing 0.6 to 1.2 mols of propylene per mol of 100% acid, diluting said partially desorbed extract to an acid strength in the range of 45 to 54 wt. percent on hydrocarbon-free basis, heating the extract so diluted in an alcohol generation zone at a temperature in the range of 90° to 110° C. for a time in the range of about 1 to 5 minutes to generate .85 to .93 mol of vaporous isopropanol per mol of propylene in extract to this stage, withdrawing spent acid from said alcohol generation zone containing less than 0.01 mol of propylene per mol of 100% acid, reconcentrating said spent acid to an acid strength in the range of 63 to 72 wt. percent on a hydrocarbon-free basis, returning the acid thus reconcentrated to said absorption zone to repeat the cycle, recovering vaporous products overhead from said zones and separating therefrom diisopropyl ether and isopropanol, the overall conversion of the originally absorbed propylene being in the range of 85 to 95 mol percent to ether and alcohol per pass.

References Cited in the file of this patent

UNITED STATES PATENTS

| | | |
|---|---|---|
| 2,105,508 | Rosen et al. | Jan. 18, 1938 |
| 2,541,673 | Smith | Feb. 13, 1951 |
| 2,609,400 | Amick | Sept. 2, 1952 |

FOREIGN PATENTS

| | | |
|---|---|---|
| 535,111 | Great Britain | Mar. 28, 1941 |